July 24, 1962 G. J. SAXENMEYER 3,046,539
TRANSLATOR
Filed July 21, 1958
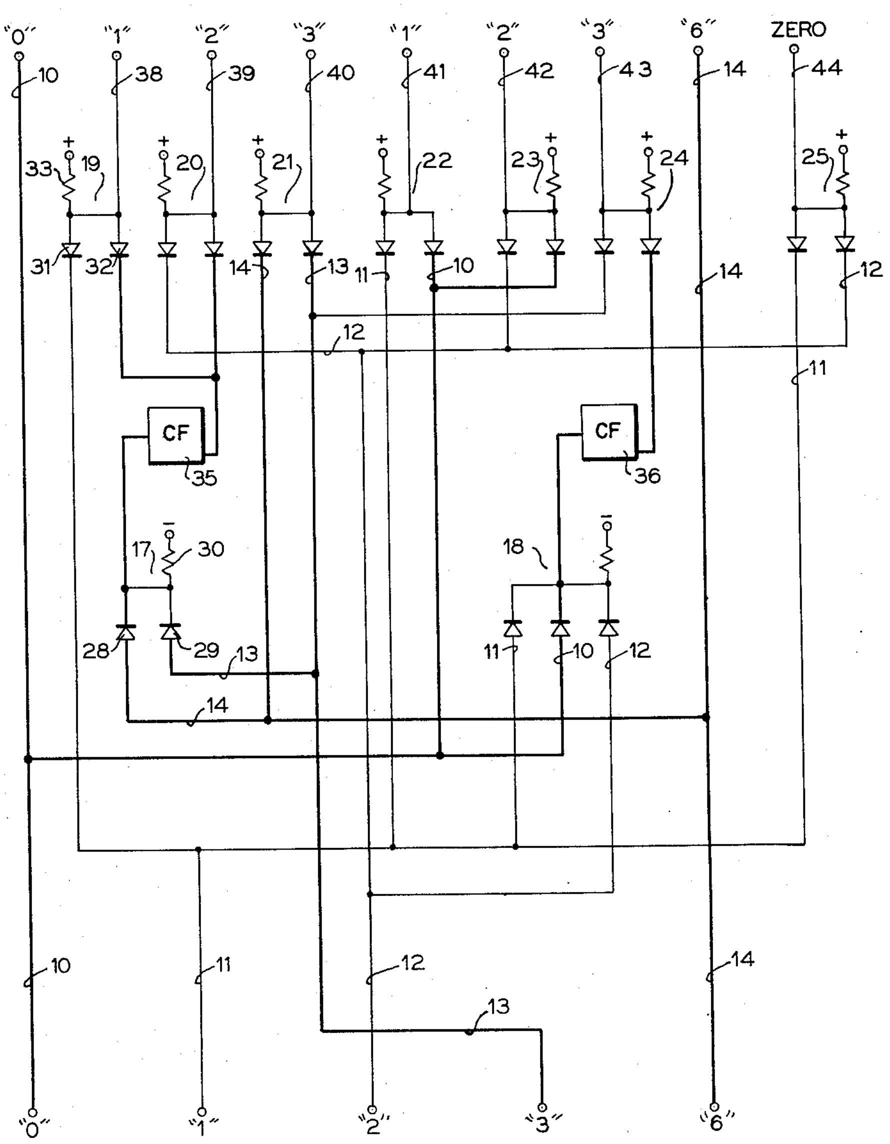
INVENTOR
GEORGE J. SAXENMEYER
BY William N. Baird
ATTORNEY United States Patent Office 3,046,539

Patented July 24, 1962

3,046,539
TRANSLATOR

George J. Saxenmeyer, Vestal, N.Y., assignor to International Business Machines Corporation, New York, N.Y., a corporation of New York
Filed July 21, 1958, Ser. No. 749,748
2 Claims. (Cl. 340—347)

The present invention relates to a code translator and in particular to a translator for converting a two-out-of-five bit code into two one-out-of-four codes.

The two-out-of-five bit code has two bits placed at various permutated locations in accordance with the decimal sum of the magnitudes represented by these locations. One such code is represented below:

| Decimal | Two-Out-of-Five | | | | |
|---|---|---|---|---|---|
| | 0 | 1 | 2 | 3 | 6 |
| 0 | 0 | 1 | 1 | 0 | 0 |
| 1 | 1 | 1 | 0 | 0 | 0 |
| 2 | 1 | 0 | 1 | 0 | 0 |
| 3 | 1 | 0 | 0 | 1 | 0 |
| 4 | 0 | 1 | 0 | 1 | 0 |
| 5 | 0 | 0 | 1 | 1 | 0 |
| 6 | 1 | 0 | 0 | 0 | 1 |
| 7 | 0 | 1 | 0 | 0 | 1 |
| 8 | 0 | 0 | 1 | 0 | 1 |
| 9 | 0 | 0 | 0 | 1 | 1 |

A two-out-of-five code has many advantages in computer work since all decimal numbers can be represented by using a maximum of five storage locations and there will be always two bits present for each number to be used for checking. The disadvantage of a two-out-of-five code is the fact that a conventional circuit for adding two numbers in two-out-of-five code comprises an extremely large number of components. The present invention provides a translating arrangement for the two-out-of-five code into two one-out-of-four codes which may be separately handled in arithmetic devices with great facility and then recombined.

It is therefore an object of this invention to provide a new and improved translating circuit.

A further object of this invention is to provide a translator circuit for a two-out-of-five code wherein the output is two one-out-of-four codes.

Another object of this invention is to provide a translator circuit for a two-out-of-five code wherein each bit is separated into a separate output group in accordance with whether it is high or low in relation to the other.

Other objects of the invention will be pointed out in the following description and claims and illustrated in the accompanying drawing, which discloses, by way of examples, the principle of the invention and the best mode, which has been contemplated, of applying that principle.

In the drawing:

The single FIGURE is a schematic illustration of the present invention.

A translator in accordance with the present invention recognizes that the "0" and "6" bit are always low and high, respectively, and therefore are routed to the low and high outputs. The bits "1," "2" and "3" can be either high or low depending on whether the decimal number is above or below 3. When the decimal number is below 3, the last recited bits are high and can be controlled to the high output by the "0" bit. The "6" bit controls the output to the low output of the same bit lines when the decimal equivalent is above 6. The decimal numbers 4 and 5, which are made up of two-out-of-five bits "1" and "3," and "2" and "3," respectively, represent the two out of the common bits in each group and the "3" bit is used to control the application of the "1" and "2" bit to the output line on the low side, while the "1" and "2" bit provide the "3" output line on the high side. Decimal zero is represented by "1" and "2" bits and recognized by the occurrence of signals in these bit positions.

The input to the translator is shown at the lower portion of the figure as lines 10 through 14 with the decimal value of the line indicated. The presence of an input on any line will be indicated by a raised voltage level or pulse while the absence of a potential on the line will be indicated by a lowered voltage level or no pulse. The output of the translator is divided into two groups and a zero indication wherein the first group is made up of lines 10, 38, 39 and 40, the second group is made up of lines 41, 42, 43 and 14 and the zero is indicated on line 44.

Circuits 17 and 18 are OR circuits which are utilized to transmit an indication of a raised voltage level on either line to the output of this circuit. As shown for OR circuit 17, a minus potential is applied to a resistor 30 which is connected in series to the parallel connected diodes 28 and 29. When a raised voltage pulse appears on either or both lines 28 and 29, the junction of the diodes and the resistor 30 will be raised to a high voltage level to indicate that at least one of the inputs to the diodes is carrying a raised potential. Conversely, when both lines to diodes 28 and 29 are at a lowered voltage level, the voltage level at the junction of resistor 30 and the diodes 28 and 29 is low.

The circuits labeled 19 through 25 are AND circuits and are made up of a resistor 33, as in AND circuit 19, with a plus voltage applied to one end with diodes 31 and 32 connected in parallel. When the level of the input to diodes 31 or 32 is in a low voltage state, there will be conduction through either one or both diodes so that the junction of resistor 33 and diodes 31 and 32 will be in a low voltage state to indicate that there is not a concurrence of raised voltage inputs. Circuits 35 and 36 are cathode followers indicated in block form since the circuit is conventional and could be as shown in U.S. Patent No. 2,798,554, FIG. 23.

The figure will be described utilizing the various inputs which could occur and the outputs in response thereto for each particular decimal number. For the decimal 0, lines 11 and 12 will have a raised voltage to the AND circuit 25 which will raise the output of line 44 to indicate there is a zero present on this line. For the decimal 1 through 3, there is always a raised potential on line 10, and for each of the successive decimal numbers 1, 2, and 3, a raised potential will appear on lines 11, 12 and 13. As mentioned previously, for line 10, the input is connected directly to the output so that a raised output appears when 0 is part of the input code. This line 10 is used to condition AND circuits 22 and 23 and through OR circuit 18 and cathode follower 36 to condition AND circuit 24. Input line 14 is used to condition AND circuits 21, 19 and 20 as shown by the heavy dark lines of the figure. Line 13, which represents one digit of decimal number 3, is used to condition AND circuit 21 and also AND circuits 19 and 20 through cathode follower 35. In describing the conditioning process, not all terminations of a particular line are mentioned but only those which are the controlling elements in determining a particular output. As now recited, the three lines 10, 13 and 14 are used for controlling a variety of AND circuits in the output so that these inputs in conjunction with an input in one of the other lines will provide a predetermined output as previously described.

While the invention has been described using a two-out-of-five code having weighed bit positions of 0–1–2–3–6, it is believed that it is apparent that other two-out-of-five codes could be used without departing from the scope of the invention. In describing the use of the invention for other codes, it should be noted that applicant is not describing the same with reference to the particular circuit arrangement shown in the figure of the drawing, but is merely describing the process of implementing the design of a specific circuit arrangement in accordance with the invention for a code having weighted bit positions of 0–1–2–4–7. As an example, the code having weighted bit positions 0–1–2–4–7 could be used but in this instance the low set of output lines would be 0–1–2 and the high set of output lines would be 1–2–4–7. In this example, it will be noted that the "0" bit is always low while a "4" and "7" bit are always high. The "0" bit would therefore control the switching of lines 1–2 to the high output and either the "7" bit or "4" bit would control the switching of lines 1–2 to the low output. The presence of a "1" and "2" bit would provide an output on the low and high side, respectively, while the presence of a "7" bit and a "4" bit would indicate a zero.

The circuit illustrated utilizes diodes for the logic circuits of AND and OR but these could just as well be of other types, e.g., electron tubes, transistors, etc.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention therefore to be limited only as indicated by the scope of the following claims.

What is claimed is:

1. A translator for an N position code including:

(*a*) input means for each said position wherein a number is represented by the energization of two of said input means;

(*b*) two groups of output means;

(*c*) each group of output means comprising one output means representing one position of said N position code exclusive of said other group and other output means in each group representing one position of said N position input code which is common to said other group;

(*d*) means connecting each output means exclusive to each group of output means to the corresponding input means represented thereby;

(*e*) means for selectively connecting an input means represented by an output means in each group to an output in one group; and (*f*) means included in said connecting means responsive to the energization of an input means connected exclusively to one group of output means for connecting the input means common to both groups of output means to the output means in the other group.

2. The apparatus of claim 1 wherein said connecting means includes means responsive to two energized inputs common to both groups of output means for connecting one of said inputs to one group and the other input to said other group.

References Cited in the file of this patent

UNITED STATES PATENTS

| | | |
|---|---|---|
| 2,518,022 | Keister | Aug. 8, 1950 |
| 2,637,017 | Holden | Apr. 28, 1953 |
| 2,761,903 | Den Hertog | Sept. 4, 1956 |
| 2,784,049 | Mitchell et al. | Mar. 5, 1957 |